United States Patent [19]
Price

[11] 3,844,878
[45] Oct. 29, 1974

[54] COMPOSITE FLEXIBLE SHEET MATERIAL
[75] Inventor: Herbert K. Price, Richmond, Va.
[73] Assignee: Reynolds Metals Company, Richmond, Va.
[22] Filed: Feb. 28, 1972
[21] Appl. No.: 229,751

[52] U.S. Cl. ............... 161/190, 156/309, 156/334, 161/205, 161/216, 161/247, 161/403, 161/236, 161/250
[51] Int. Cl. ........................................... B32b 27/40
[58] Field of Search ........... 161/151, 205, 403, 216, 161/190, 247; 156/309, 334

[56] References Cited
UNITED STATES PATENTS

| | | | |
|---|---|---|---|
| 3,411,981 | 11/1968 | Thomas | 161/190 |
| 3,413,188 | 11/1968 | Allen | 161/195 |
| 3,468,092 | 9/1969 | Chalmers | 161/205 X |
| 3,503,823 | 3/1970 | Richart et al. | 161/216 X |
| 3,511,748 | 5/1970 | Heeb et al. | 161/205 X |

Primary Examiner—George F. Lesmes
Assistant Examiner—Patricia C. Ives
Attorney, Agent, or Firm—Glenn, Palmer, Lyne & Gibbs

[57] ABSTRACT

A composite roofing or siding sheet and method of making the same is provided. Metal foil is laminated over a fibrous base layer by an improved polymeric bonding system.

14 Claims, 7 Drawing Figures

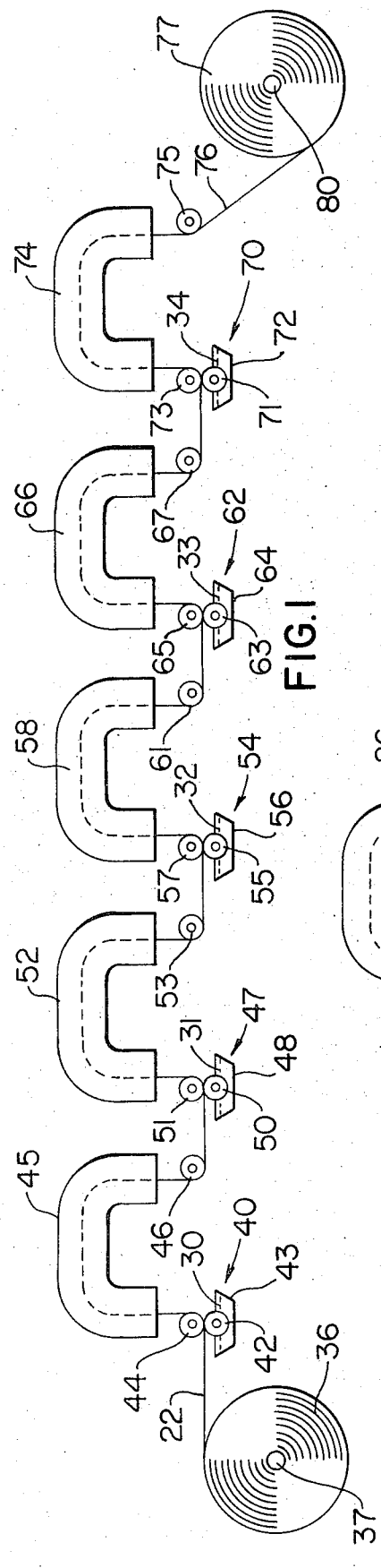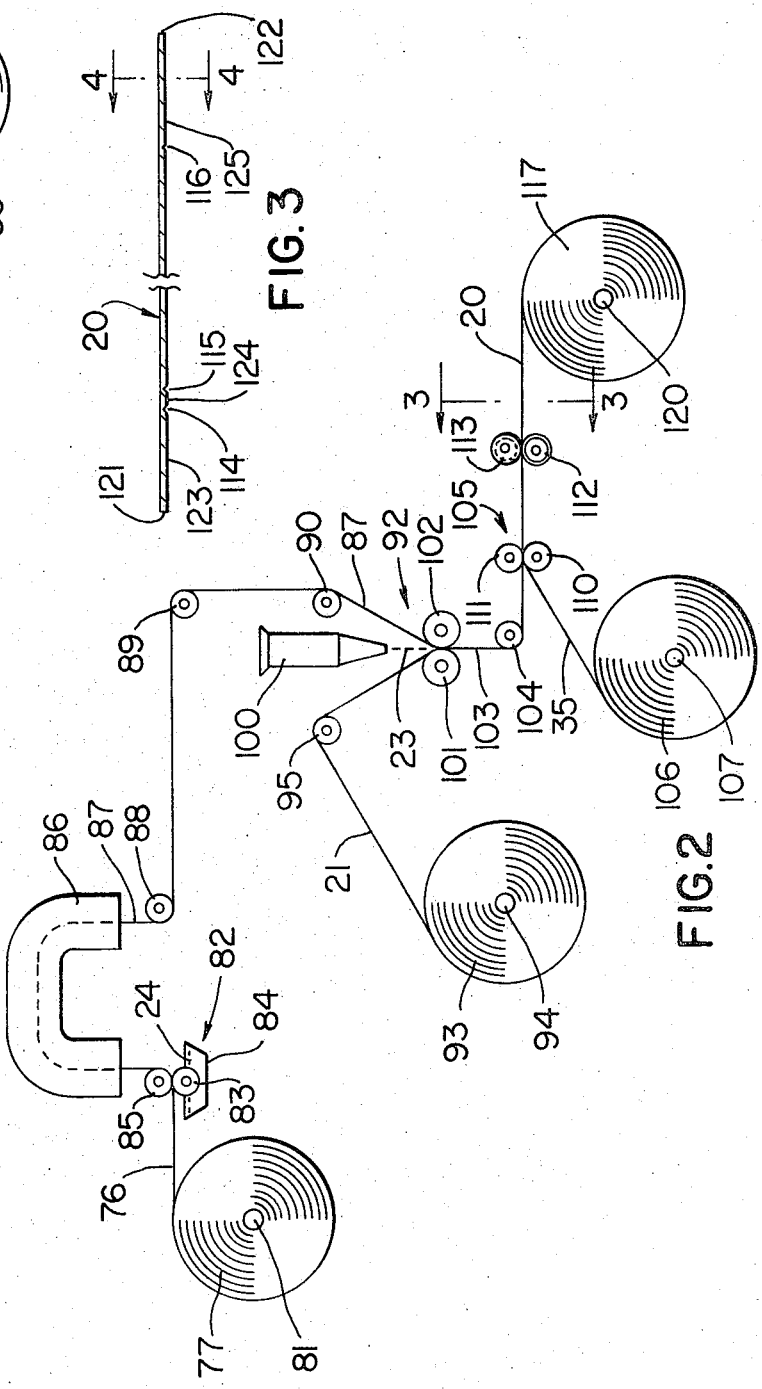

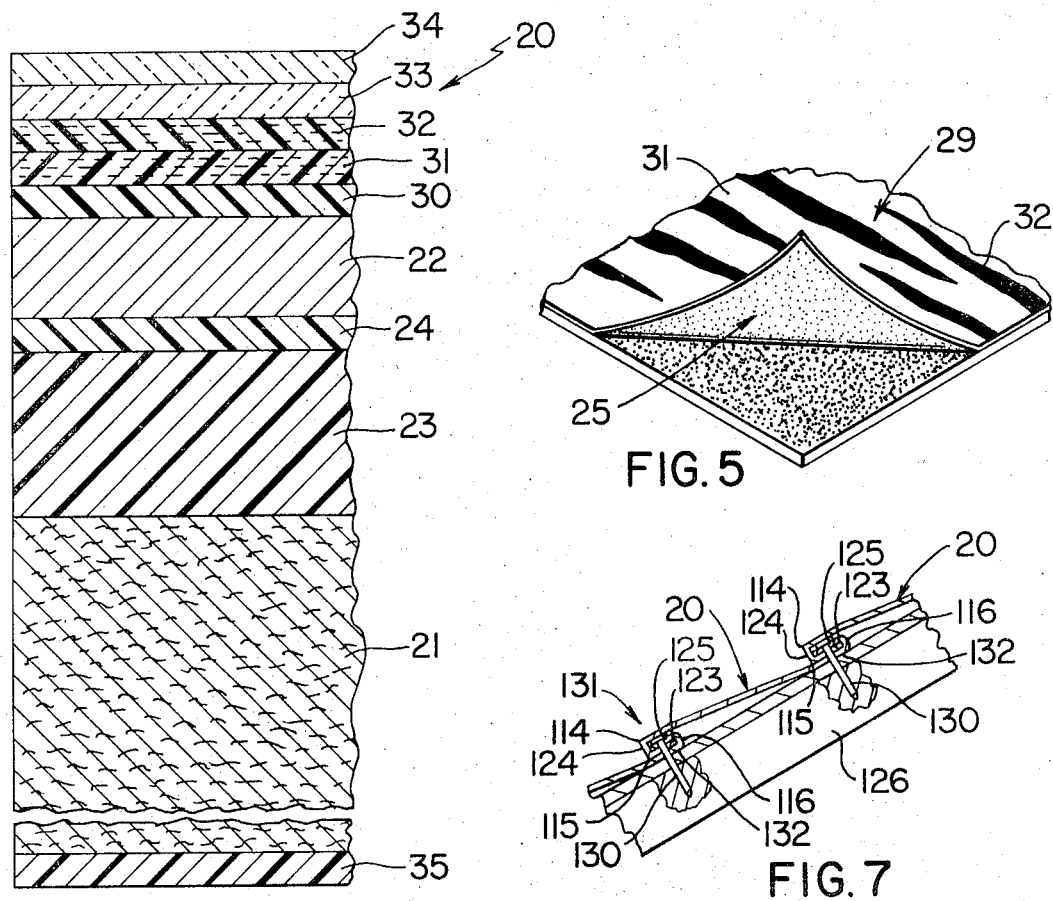

COMPOSITE FLEXIBLE SHEET MATERIAL

BACKGROUND OF THE INVENTION

The idea of laminating foil to a fibrous base has long been known for the purpose of making shingles for roofing and siding. However, difficulties with delamination under adverse conditions, such as summer heat, have interferred with taking full advantage of the potential economies, aesthetic appeal and light weight of this combination.

SUMMARY

In accordance with the present invention, foil is laminated to a fibrous base in a manner having improved resistance to delamination under service conditions of roofs and walls of buildings.

In particular, the sheet material of this invention is comprised of a fibrous base and a metal foil layer which are bonded together by a layer made of a straight chain aliphatic hydrocarbon polymer having a $CH_2$ backbone. The layer has a lower portion thereof partially permeated within the fibrous base and the top surface bonded to the metal foil layer whereby the layer serves to provide a bond between the fibrous base and the metal foil layer.

Other details and advantages of the invention will become apparent as the following description of the present preferred embodiments proceed.

BRIEF DESCRIPTION OF THE DRAWINGS

The accompanying drawings show present preferred embodiments of the invention, in which:

FIG. 1 is a schematic presentation illustrating one exemplary embodiment of an apparatus and method which may be employed to coat one surface of a web of metal foil with decorative and protective coatings comprising a primer, a plurality of ink layers, and a plurality of clear layers to define a laminated construction;

FIG. 2 is a schematic view illustrating an exemplary apparatus and method which may be used to combine the laminated construction of FIG. 1 with a fibrous base material and with a web used to define a protective layer for the bottom surface of the fibrous base and suitably scoring the resulting construction to define one exemplary embodiment of the invention;

FIG. 3 is a cross-sectional view taken on the line 3—3 of FIG. 2;

FIG. 4 is a greatly enlarged fragmentary cross-sectional view, not to scale, taken essentially on the line 4—4 of FIG. 3;

FIG. 5 is a fragmentary perspective view of a fragmentary corner portion of the composite laminate shown in FIG. 3 showing a portion of the fibrous base partially peeled away;

FIG. 6 is a fragmentary perspective view illustrating elongated sheets of the composite sheet material of this invention installed in a protective manner over an associated structure; and FIG. 7 is an enlarged view with parts in cross section and parts broken away taken essentially on the line 7—7 of FIG. 6.

DESCRIPTION OF THE PRESENT PREFERRED EMBODIMENTS

Referring now to the drawings, FIG. 4 illustrates a composite roofing or siding sheet 20 which may be made by the system illustrated in FIGS. 1 and 2.

The sheet 20 comprises a fibrous underlayer 21 (which term includes equivalent reticulated structures), preferably in the form of an asphalt impregnated felt and a metal overlayer 22, preferably of aluminum foil. The foil has certain advantages of reflectivity and moisture imperviousness, while the asphalt-impregnated fibrous base has many useful qualities long recognized in the building industry, including that of low cost. Past experience has shown that asphalt is not a particularly satisfactory agent for bonding impregnated felt and foil together, because at elevated temperatures particularly during the summer, asphalt is apt to loosen its grip on the foil, if no primer is used under the foil. Past experience has further shown that if a primer is used, volatile elements in the asphalt tend to work through the primer under the influence of heat, and then spread out between the primer and the foil thereby causing one to detach from the other.

In accordance with the present invention, a suitable primer 24 is selected to bond to the foil and to an adhesive layer 23 underneath. The layer 23 is a polymeric adhesive selected to have the combined qualities of bonding to the primer 24, of resisting penetration of moisture and volatiles from the asphalt impregnated fibrous underlayer, of having a higher melting point than the asphalt, and of being substantially more viscous when melted than the asphalt is at the same melting temperature. While a straight chain aliphatic hydrocarbon polymer having a $CH_2$ backbone is the class of polymer generally considered most suitable for this purpose, ordinary low density polyethylene having as ASTM 1238-57-T melt index of 2 to 20 is presently preferred. Polypropylene or copolymer of ethylene and acrylic acid or ethylene and vinyl acetate are also suitable. The polyethylene has a melting point of about 220°F. while asphalt of the kind used for roofing melts at about 196°F. Even when raised to a relatively high temperature, such as 600°F., such polyethylene is still quite viscous, while such asphalt is very liquid at that temperature. As a result, when the polyethylene is at about 600F. and is pressed against the asphalt impregnated fibrous underlayer, it apparently displaces the adjacent asphalt enough to enable the polyethylene to interlock with the uppermost fibers of the underlayer. Also, there may be some bonding as a result of physical mixing of the melted polyethylene and the more liquid asphalt. In any case, the result of the two layers being pressed together while the polyethylene is at a viscous melt temperature is to form a strong bond between them. For example, at room temperature, if the sheet material is subjected to a delaminating test it delaminates within the asphalt impregnated fibrous layer instead of delaminating at the interface of the polyethylene and the asphalt impregnated fibrous layer. See FIG. 5 for a general appearance of the foil with fibers of the fibrous material adhesively bonded thereto at the conclusion of a delaminating test.

Examples of primers which may be selected to form an intermediate connection between the foil 22 and the polymer 23, especially if it is the above-mentioned polyethylene, are shellac, cyanoethylacrylate and various polyurethanes. Shellac has the advantage of being inexpensive and readily available, but to date it has not passed satisfactorily the ASTM 481B water tests. That leaves the polyurethanes as the best choice, at present.

The primer should also be insoluble after curing and be able to resist solvation by hydrocarbon volatiles in the asphalt. A multiple layers primer could be used, if it meets the necessary service criteria. In any case, the primer should have qualities of being highly polar where it is needed for good adhesion to the metal foil, and of having good resistance to water and oily organic substances.

The composite sheet 20 may be further improved by adhering to the bottom surface thereof a layer 35 of a polymer like that suitable for use in the polymer layer 23. As in the case of the layer 23, low density polyethylene is preferred for the layer 35. The layer 35 protects the asphalt-impregnated layer 21 from penetration by vapors coming from beneath the roof, and cooperates with the polymer layer 23 in giving the qualities of flexible toughness and body to the composite sheet 20. The fact that all the layers of the composite 20 are flexible makes it possible for the sheet to bend rather than break, while the polymer layer 23, especially, aided by the polymer layer 35, if present, combines well with the other layers to provide a sheet having great toughness and resistance to physical abuse during and after installation, as well as resistance to extremes of temperature and moisture which many roofs have to withstand for long periods.

To assure that a decorative pattern will adhere to the top surface of the aluminum foil layer 22, a suitable coating in the form of a primer coating 30 is provided on such top surface and coating 30 is preferably a coating of a vinyl terpolymer primer. The decorative pattern is illustrated at 29 in FIG. 5 and is definded by suitable ink means in the form of a plurality of two ink coatings 31 and 32 applied against the top surface of the primer 30. Each coating 31 and 32 of this example is of a different color with coating 31 covering substantially the entire surface of layer 22 and coating 32 being an irregular striped coating applied over coating 31. The ink or coatings 31 and 32 defining the decorative pattern 29 are protected by two or more clear coatings 33 and 34 which provide their protective function yet are transparent so that the decorative pattern is readily visible therethrough.

The ink coatings 31 and 32 may be applied over the primer coating 30 to define the pattern 29 and in one application of this invention coating 31 is a white coating with stripped coating 32 being a black coating. However, it will be appreciated that any desired number of ink coatings may be applied over the primer coating 30 to form any design, pattern, picture, or the like and utilizing any color or combination of colors. Further, once one or more clear coatings are applied over the desired pattern, such pattern is effectively protected for extended time periods.

Hereinafter, the liquid used to define a particular coating or layer at each coating station to be described will be given the same reference numeral as its corresponding layer or coating and this will assure easier understanding of the invention.

The material 20 is preferably made utilizing the apparatus and method illustrated in FIGS. 1 and 2 of the drawings. As shown in FIG. 1, a web of aluminum foil which defines the layer 22 of the material 20 is wound on a suitable supply roll 36 on a shaft 37.

The web 22 is first moved through a coating station 40 where a primer coating 30 is applied thereon by a suitable applicator. An applicator roll 42 is rotatable in a container 43 which contains the coating material 30. The applicator roll 42 cooperates with a back-up roll 44 to provide the desired coating on one surface of the web 22 and a doctor blade, not shown, may be provided to precisely control the thickness of such primer coating.

The web with its coating 30 applied thereon is passed through a suitable drying oven 45 where the coating 30 is dried, around a turn roll 46, and through a second coating station 47 where an applicator roll 50 is rotated in a bath of ink 31 contained in a receptacle 48. The roll 50 cooperates with a backup roll 51 to apply the ink coating 31 in the desired manner. The web is then moved through a second drying oven 52 where the coating 31 is dried, around a turn roll 53, and through a third coating station 54 where an applicator roll 55 is rotated in a bath of ink 32 contained in a receptacle 56. The roll 55 cooperates with a backup roll 57 to apply the second ink coating 32.

The web is then moved through a third drying oven 58 where the coating 32 is dried, around another turn roll 61, and through a fourth coating station 62 where an applicator roll 63 is rotated in a bath of clear coating contained in a receptacle 64. The roll 63 cooperates with a backup roll 65 to apply a clear coating 33 over coatings 31 and 32.

The web is then passed through another drying oven 66 where the coating 33 is dried, around a turn roll 67, and through a fifth coating station 70 where an applicator roll 71 is rotated in a bath of clear coating 34 contained in a receptacle 72. The roll 71 cooperates with a backup roll 73 to apply the outermost coating 34 over coating 33.

The web is then passed through another drying oven 74 and the coating 34 dried whereupon the web with its dried coatings or layers 30–34 defines a decorated and protected web construction which is designated generally by the reference numeral 76. The construction 76 is moved around a turn roll 75 and wound in coil form to define a supply roll 77 thereof and the supply roll 77 is rotatably supported by a shaft 80.

The construction 76 could be moved prior to winding thereof in coil form to another station where the underlayer 21 could be bonded thereagainst in a continuous uninterrupted manner; however, in this example of the invention, the web construction 76 is wound to define a supply roll 77 and further processed as will now be explained.

The supply roll 77 is rotated on a shaft 81 and its web is passed through a coating station 82 where a coating roll 83 is rotated in a bath of primer 24 contained in a receptacle 84. The roll 83 cooperates with a backup roll 85 to provide the coating 24 of primer on the undersurface of the aluminum foil web 22. The coated construction is then passed through another drying oven 86 where the coating 24 is dried to define a construction 87 and construction 87 is moved around turn rolls 88, 89 and 90 to a laminating station 92.

At laminating station 92 the construction 76 is laminated to the fibrous material 21 with adhesive 23 therebetween. The underlayer 21 of fibrous material which has been suitably treated and supplied as a supply roll 93 thereof is supported for unwinding rotation on a shaft 94. The web 21 is unwound from its supply roll and moved around a turn roll 95 to the laminating station 92.

The layer 23 is defined by extruding a liquid polymer, which is at an elevated temperature and pressure, through a conventional extrusion head 100. For simplicity, the liquid polymer is also designated by the reference numeral 23 and is introduced between web 21 and web construction 87 at station 92 upon entry of these webs between a pair of combining and cooling rolls 101 and 102 whereupon simultaneously layer 23 is formed and web construction 87 and web 21 are bonded together by layer 23 to define a laminated construction 103.

The laminated construction 103 is moved around a turn roll 104 through a second laminating station 105 where the web or layer 35 of a suitable plastic, such as polyethylene may be bonded against the bottom surface of the fibrous material 21. The web of polyethylene 35 is unwound from an associated supply roll 106 thereof which is supported for unwinding rotation on a shaft 107. A pair of combining rolls 110 and 111 are provided at station 105 and roll 110 may be heated in order to partially melt the polyethylene and cause adherence thereof to and/or impregnation of the bottom surface of the fibrous material 21.

The construction is then passed through a pair of cooperating scoring rolls 112 and 113 with roll 112 having a plurality of three spaced annular projections extending from its cylindrical surface and roll 113 having three cooperating annular grooves therein each adapted to receive an associated projection. The projections and grooves in rolls 112 and 113 respectively define score lines 114, 115 and 116 in the sheet material 20, see FIG. 3. The sheet material 20 is then wound in coil form to define an associated supply roll 117 thereof which is supported for rotation on a shaft 120.

Thus it is seen that the sheet material 20 is produced so that it has an extended length and may be installed in long strips as will be described in detail subsequently. The sheet material 20 has opposed parallel edges 121 and 122, see FIG. 3, defining a substantially uniform width therealong. The score line 114 is provided in the material so that it extends inwardly from the bottom surface of the layer 35 and is arranged parallel to the edge 121 to define a first outer strip 123 between the score line 114 and edge 121. The score line 115 is also arranged parallel to and closely adjacent the score line 114 to define an intermediate strip 124 therebetween. The score line 116 is arranged parallel to the score lines 114 and 115 and defines another outer strip 125 which adjoins the opposite edge 122 of the material 20. Score lines 114, 115 and 116 and their associated strips 123, 124 and 125 enable the material 20 to be installed so that it is firmly attached against a wall or roof substructure while providing a pleasing appearance.

FIG. 2 of the drawings illustrates one example of an apparatus and method which may be used to define the layer 23 and use such layer to bond the fibrous material 21 and the aluminum foil layer with its various coatings. However, it will be appreciated that a multipurpose layer may be formed by taking the web construction 87 and unwinding a previously formed web 23 from an associated supply roll thereof and combining the construction 87, web 23, and web 21 at one or more suitable combining stations using suitable combining rolls and heating means.

In this disclosure of the invention the fibrous material 21 has been described as being comprised of a layer of asphalt impregnated felt paper, however, asbestos impregnated paper, or a flame retardant kraft paper would be equally suitable.

EXAMPLE

The thicknesses of the various coatings or layers comprising the sheet material 20 may vary for different applications. In one exemplary application of this invention the various layers were considered acceptable if they had thicknesses essentially as follows: the moisture and puncture barrier layer 35—½ to 4 mils, the layer 21 of asphalt impregnated felt paper—60 to 120 mils, the layer 23—2 to 3 mils, the primer 24—0.1 mil, the aluminum foil layer 22—2 to 6 mils, the vinyl terpolymer primer layer 30—0.1 mil, the ink layers 31 and 32 being acrylic inks—0.1 to 0.2 mil each, and the clear layers 33 and 34 being clear acrylics—0.3 mil each. In the same exemplary application of this invention the various layers were made up of the following materials: layer 35—a film of low density polyethylene; layer 21—a 30lb. asphalt impregnated felt; layer 23—a polyethylene homopolymer having an ASTM melt index of about 8; layer 24—a primer consisting of a resin having terminal or pendant hydroxyl or carboxyl groups which are reacted with a diisocyanate to produce a urethane film; layer 22—aluminum foil; layer 30—terpolymer of 86 percent vinyl chloride, 13 percent vinyl acetate and 1 percent maliec acid by weight, layers 32 and 31—same as 33 and 34 structurally except organic or inorganic pigments are added to provide appropriate colors; layers 33 and 34—esters of acrylic acid which may be homopolymerized or co-polymerized with other esters.

The sheet material 20 of this invention can be easily attached in position against an associated structure so that it has aesthetic appeal yet provides an improved covering whether it is used as roofing or siding and is capable of resisting the elements for extended periods.

Each elongated section of material 20 made in accordance with this invention may be easily installed in position as illustrated in FIG. 6 of the drawings. In particular, the strip portion 125 is initially nailed or fixed to the structure 126 using suitable nails 30 as illustrated at 131 in FIG. 7 whereupon the remainder of the elongated strip of material 20 is folded about score lines 114 and 115 so that the strip 124 defines a substantially planar surface arranged perpendicular to the main portion of the section 20, and the strip portion 125 is folded about its score line 116 so that the exposed surface thereof overlaps a corresponding exposed surface 132 of the area between score lines 115 and 116. The next elongated section of material 20 which is to be installed in position is then installed with its strip portion 123 inserted between the strip portion 125 of the previously installed section 20 and portion 132 whereupon suitable fasteners such as nails 130 extend through the three thicknesses of material comprised of the folded strip portion 125 of the previously installed elongated roofing section 20, strip portion 123 of the elongated sections being installed in position, and strip portion 132 of the previously installed elongated section whereupon the elongated section 20 being installed is then folded about its fold lines 114 and 115 and the operation repeated until the entire supporting structure 126 is suitably covered.

The elongated sections of sheet material 20 provide aesthetic appeal because of the distinct shadow lines defined by strip portion 124. In addition, the nails or fasteners holding the elongated sections 20 in position are effectively isolated and the fastening action is achieved through a plurality of layers whereby there is minimum liklihood of the roofing material being pulled away from its supporting structure by wind, or the like.

The material 20 presented herein has been shown as a decorative construction having various layers of ink and clear coatings applied thereover; however, it will be appreciated that the material 20 may be suitably embossed simulating wood grain or other desired effects for aesthetic appeal and in accordance with standard practice.

While present exemplary embodiments of this invention and methods of practicing the same, have been illustrated and described, it will be recognized that this invention may be otherwise variously embodied and practiced within the scope of the following claims.

What is claimed is:

1. A composite flexible sheet material suitable for roofing, siding and the like, comprising a metal foil layer, a primer adhering to said foil layer, a polymeric layer made of a straight chain aliphatic hydrocarbon polymer having a $CH_2$ backbone and adhering to said primer, and an asphalt impregnated fibrous base layer, said polymeric layer having a lower portion thereof partially permeated within said fibrous layer to interlock said polymeric layer to fibers in said fibrous layer, said interlocking being due at least in part to the presence of said lower portion of said polymeric layer at locations which would ordinarily have been occupied by asphalt in said fibrous base layer, said polymeric layer having a stronger bond with the asphalt impregnated fibrous layer than interior portions of the asphalt impregnated fibrous layer have to each other, said polymeric layer being moisture resistant, having a higher melting temperature than the asphalt, and said polymeric layer having an ASTM melt index between about 2 to 20.

2. The composite sheet of claim 1 in which the polymeric layer is low density polyethylene.

3. The composite sheet of claim 1 in which the polymeric layer is low density polypropylene.

4. The composite sheet of claim 2 in which the primer is a urethane polymer.

5. The composite sheet of claim 2 in which the asphalt impregnated fibrous layer has its side arranged opposite said polymeric layer covered with a polyethylene layer.

6. The composite sheet of claim 3 in which the asphalt impregnated fibrous layer has its side arranged opposite said polymeric layer covered with a polypropylene layer.

7. A composite flexible sheet material comprising, a fibrous base, a metal foil layer having a bottom surface coated with a first primer coating and a top surface coated with a second primer coating, and a polymeric layer made of a straight chain aliphatic hydrocarbon polymer having a $CH_2$ backbone, said polymeric layer having a lower portion thereof partially permeated within said fibrous base to interlock said polymeric layer to fibers in said fibrous base and having a top surface bonded against said first coating, said polymeric layer providing a bond between said fibrous base and metal foil layer and said bond being stronger than the bond between the fibers themselves of the fibrous base, said base and layers together with said coatings all being flexible to thereby assure said composite sheet is flexible, said polymeric layer combining with the other layers to assure said sheet has toughness and resistance to physical abuse and extremes of temperature and moisture.

8. A composite sheet material as set forth in claim 7 in which said fibrous base is in the form of an asphalt impregnated felt paper.

9. A composite sheet material as set forth in claim 7 in which said fibrous base is in the form of an asbestos impregnated paper.

10. A composite sheet material as set forth in claim 7 in which said fibrous base is in the form of a flame retardant kraft paper.

11. A composite sheet material as set forth in claim 7 in which said second coating is a vinyl terpolymer comprising about 86 percent vinyl chloride, about 13 percent vinyl acetate, and about 1 percent maleic acid by weight.

12. A composite sheet material as set forth in claim 7 in which said polymeric layer is polyethylene.

13. A composite sheet material as set forth in claim 7 in which said polymeric layer is polypropylene.

14. A composite sheet material as set forth in claim 7 in which, said polymeric layer is polyethylene, said fibrous base is comprised of paper, and said polyethylene partially permeates into the paper, and a protective layer of plastic material is bonded against the bottom surface of said fibrous material.

* * * * *